Nov. 30, 1937.   M. D. KEYSER   2,100,963
ARTIFICIAL LURE
Filed Dec. 21, 1936
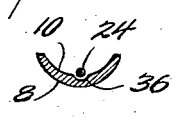
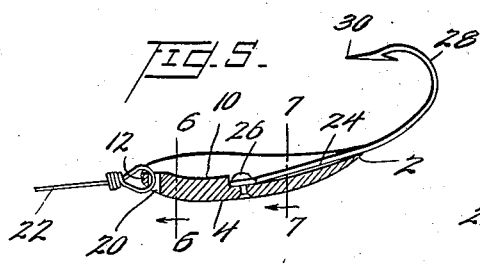
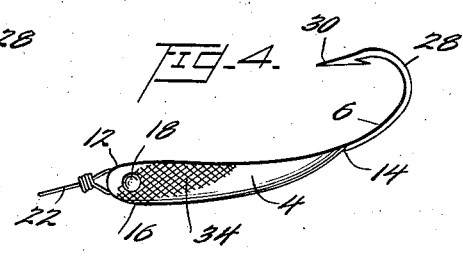
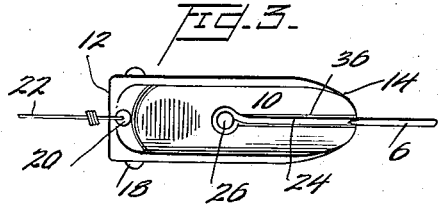
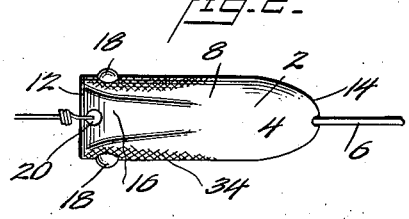
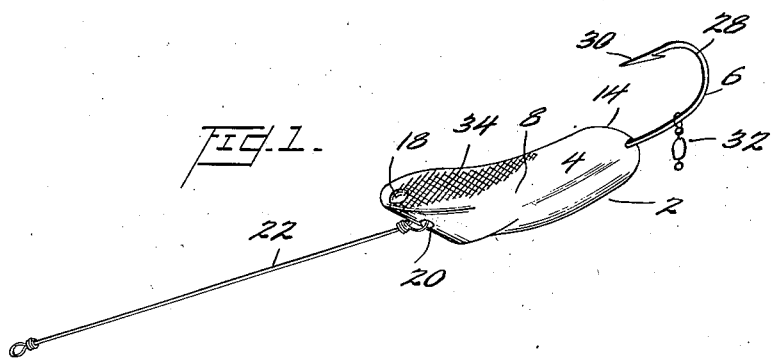
Inventor
Merriel Dale Keyser
By
Chas. Silver
Att'y Patented Nov. 30, 1937

2,100,963

UNITED STATES PATENT OFFICE 2,100,963

ARTIFICIAL LURE

Merriel Dale Keyser, Edgewood Arsenal, Md.

Application December 21, 1936, Serial No. 117,040

3 Claims. (Cl. 43—42)

This invention relates to artificial bait or lure for fish, and has particular reference to improvements in the spoon-type of fish lure.

Among the objects of this invention is to provide a lure that will efficiently and effectively attract fish by simulating the movements of injured or wounded minnows when the lure is moved through the water.

It is a further object of this invention to provide a fish lure closely resembling the head end and main body portion of a minnow and thereby serve as a more effective bait for attracting the larger or prey fish.

A still further object of this invention is to provide a lure possessing the properties and features heretofore described, the body portion of said lure being of such configuration, weight, and weight distribution that the lure will function in the manner desired in simulating the movements of injured or wounded minnows.

Other, further and more specific objects of this invention will become readily apparent to persons skilled in the art from a consideration of the following description when taken in conjunction with the accompanying drawing wherein:

Fig. 1 is a perspective view of my artificial lure or bait.

Fig. 2 is a top plan view of the lure.

Fig. 3 is a bottom plan view of the lure.

Fig. 4 is a side view thereof.

Fig. 5 is a longitudinal section through the center of the lure.

Fig. 6 is a section through the body of the lure, taken along line 6—6 of Fig. 5.

Fig. 7 is a section through the body and hook of the lure, taken along line 7—7 of Fig. 5.

The lure, designated as a whole by the reference numeral 2, comprises the spoon-shaped body 4 and the hook 6. The body 4, preferably of cast aluminum, is formed with a convex outer surface 8 and a concave inner surface 10. The front or snout end 12 of the body is thick and blunt and the body is of substantially uniform width from the front end to the rounded rear end 14. The convex outer surface 8 of the body 4 and the concave inner surface 10 result in a spoon of gradually receding taper lengthwise from a point 16 near the nose of the body 4 to the rear end 14. The thickness of the spoon also recedes in both directions from the central longitudinal section to each side of the spoon, as will be seen from Figs. 6 and 7. The weight of the spoon is concentrated along its major axis toward the bottom and toward the front. This brings its center of gravity near the end of the thick snout.

The blunt snout end 12 of the body resembles very closely the head of a minnow, and in order to provide a more realistic appearance to the lure the eyes 18 are provided on each side of the body 4. These eyes are generally of glass and are preferably colored to give the luring effect desired. The snout end 12 is also perforated at 20 for attachment of the line or tackle 22.

The shank 24 of the hook 6 is superimposed on the body 4 and is preferably embedded therein. Generally, a rivet or other fastener 26 is provided to aid in securing the end of the hook to the body of the bait. The curved portion 28 of the hook extends beyond the body 4, is disposed substantially radial to the concave and convex surfaces of the body 4, and the barbed pointed end 30 of this hook 6 is substantially in alinement with the rear end 14 of the body 4.

If desired a spinner 32, freely movable about the curved part 28 of the hook, may be provided on the hook 6. Also, various portions of the body 4 may be colored to produce the desired alluring effect.

The body 4 is preferably formed with roughened or grooved portions 34 on each side near the snout end.

The body 4 is cast in the form shown with the longitudinal groove 36. The hook 6 is placed in this groove 36 and held in proper position by this groove 36 and the rivet or bolt 26.

The hook and body assembly possesses a specific gravity approximately that of aluminum. If desired, other material, such as wood, Celluloid, etc., may be used for the body, in which case it should be weighted so that the specific gravity of the assembly of hook and body will be approximately that of aluminum. By having the curved portion of the hook project beyond the body 4 and the shank of the hook fastened to the body 4, as shown in the drawing, a proper balance results so that when drawn through the water the bait will assume the desired position for effective operation. With the hook projecting beyond the body 4 and the curved part 28 bent back so as to bring the point 30 in alinement with the rear curved end 14 of the body 4, the catch of fish is made more reliable and secure. When the device is drawn through water the body 4 does not spin, but wabbles and undergoes motions which closely simulate those of injured or wounded minnows. Thus, the bait is visible and very attractive to the large fish.

This bait or lure is highly efficient and very durable. This bait is clearly distinguishable from prior devices of this kind in having the snout end blunt, thereby resembling a young minnow in contradistinction from this kind of lure which has been provided with a tapering snout end, characteristic of older fish.

The rear end of the lure does not resemble the tail end of a fish; nevertheless, in its wabbling movement when drawn through the water it produces an effect so closely resembling the wabbling rear tail portion of a moving injured minnow, that from the standpoint of attracting and luring the larger fish it has proved to be efficient and highly successful.

My new lure may be used for casting as well as trolling. A lure constructed as heretofore described will be balanced to travel through the water with the thick, heavy, front portion of the body 4 down and the light rear end 14 up and with the point of the hook projecting upwardly. When the fish grabs this lure, the point of the hook will lodge in the hard upper part of the mouth of the fish instead of in the soft tissue, and thus prevent the fish from disengaging itself. Since the curved part 28 of the hook extends beyond the body 4 to the extent heretofore shown and described, the fish will usually grab the hook portion instead of the body of the lure or bait.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a fish lure, a spoon-like body having its front portion thick and shaped like the snout of a minnow and its center of gravity near the end of said front portion, its weight approximately equal to that of an aluminum body of the same size and shape, a gradually receding thickness from a point near the end of the thick front portion to the rear end, and its outer surface convex and rounded from side to side and end to end, and a hook fixed to said body, said hook having its shank adjacent to said body, the bent portion projecting outwardly from said body, and its pointed end in substantial alinement with the rear end of said body.

2. In a fish lure, a spoon-like body having its front portion thick and shaped like the snout of a minnow and its center of gravity near the end of said front portion, a gradually receding thickness from a point near the end of the thick front portion to the rear end, and substantially uniform width through the greater portion thereof, and a hook fixed to said body, said hook having its shank adjacent to said body, the bent portion projecting outwardly from said body, and its pointed end in substantial alinement with the rear end of said body.

3. In a fish lure, a spoon-like body having its front portion thick and shaped like the snout of a minnow and its center of gravity near the end of said front portion, its weight approximately equal to that of an aluminum body of the same size and shape, a gradually receding thickness from a point near the end of the thick front portion to the rear end, substantially uniform width through the greater portion thereof, its outer surface convex and rounded from side to side and end to end, and the opposite inner face concave through the greater portion thereof, and a hook fixed to said body, said hook having its shank adjacent to said body and the bent portion projecting outwardly from said body, disposed substantially radial to the outer surface of said body and its pointed end in substantial alinement with the rear end of said body.

MERRIEL DALE KEYSER.